United States Patent [19]
Stitt et al.

[11] Patent Number: 5,229,700
[45] Date of Patent: Jul. 20, 1993

[54] CALIBRATION OF SIGNAL FEEDBACK THROUGH VCO'S

[75] Inventors: Thomas D. Stitt; Philip R. Cooke; Ajith K. Kumar, all of Erie, Pa.

[73] Assignee: General Electric Company, Erie, Pa.

[21] Appl. No.: 873,328

[22] Filed: Apr. 24, 1992

[51] Int. Cl.$^5$ .............................................. H02P 5/40
[52] U.S. Cl. ..................... 318/618; 318/798; 318/811; 318/567
[58] Field of Search ........ 318/138, 254, 439, 560-640, 318/800-820, 780-790; 363/54-57, 40-43; 323/285

[56] References Cited

U.S. PATENT DOCUMENTS

| | | | |
|---|---|---|---|
| 3,781,627 | 12/1973 | Binning et al. | 318/562 |
| 3,793,511 | 2/1974 | Bala et al. | 318/571 |
| 3,860,858 | 1/1975 | Nola . | |
| 3,987,282 | 10/1976 | Lau et al. | 318/569 X |
| 4,023,083 | 5/1977 | Plunkett . | |
| 4,322,671 | 3/1982 | Kawada et al. | 318/798 |
| 4,327,315 | 4/1982 | Kawada et al. | 318/811 |
| 4,356,544 | 10/1982 | Ono et al. | 318/811 X |
| 4,412,163 | 10/1983 | Angersbach et al. | 318/567 |
| 4,439,379 | 3/1984 | Chiang et al. | 318/685 |
| 4,580,083 | 4/1986 | Omae et al. | 318/139 X |
| 4,672,286 | 6/1987 | Williams | 318/798 |
| 4,680,525 | 7/1987 | Kobari et al. | 318/798 |
| 4,734,634 | 3/1988 | Kito et al. | 318/778 |

Primary Examiner—Paul Ip
Attorney, Agent, or Firm—R. Thomas Payne

[57] ABSTRACT

A method and system for calibration of a primary signal processing path without interruption of signal processing utilizes a calibration signal processing path which is periodically used to process a signal concurrently with processing in the primary path. Any difference is compensated by gain adjustment in the primary path. In one form, a plurality of primary paths are sequentially compared with a calibrated path. The calibrated path is periodically checked using a precision reference and any error is corrected before comparison of the primary paths.

19 Claims, 1 Drawing Sheet

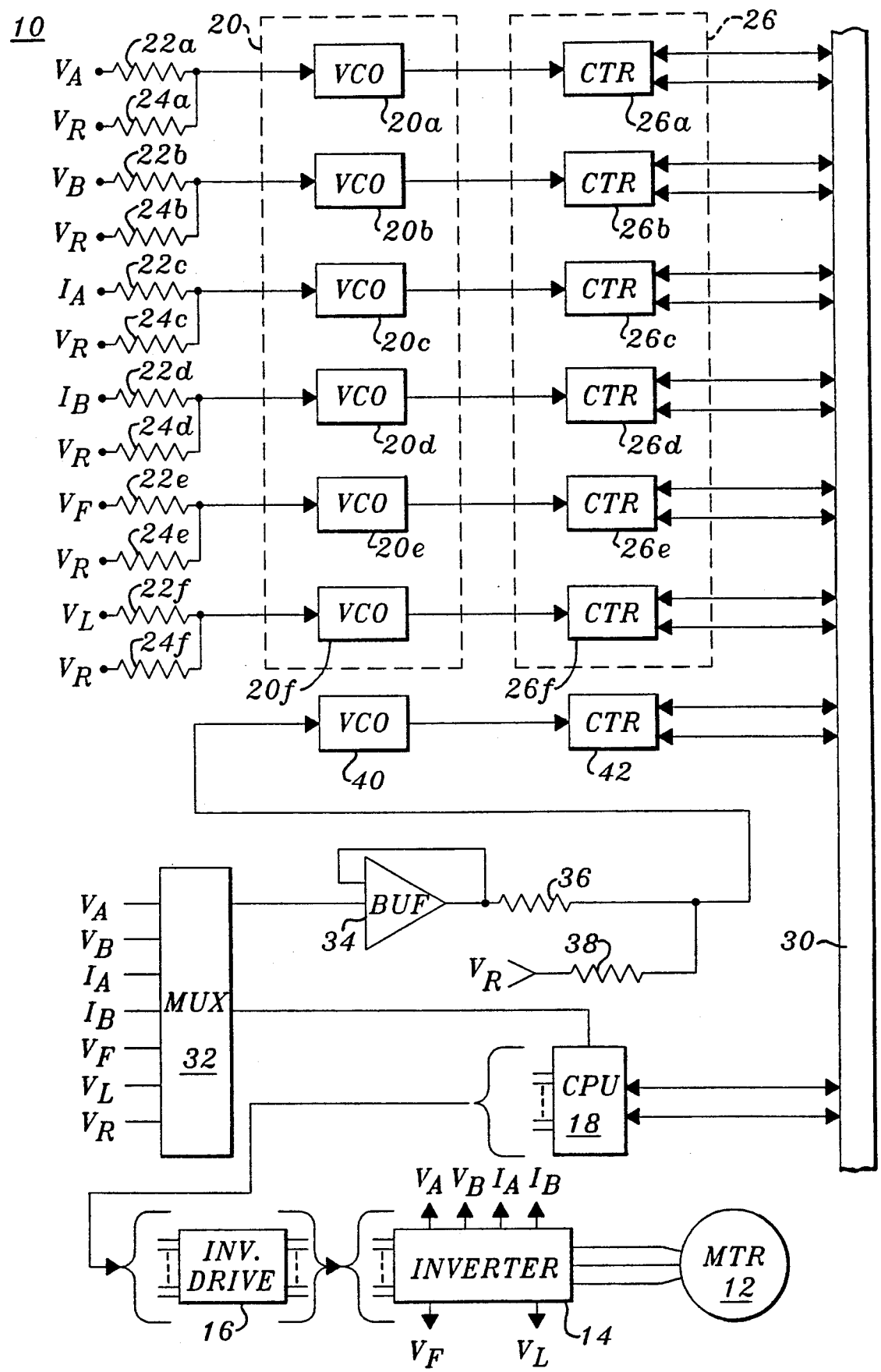

CALIBRATION OF SIGNAL FEEDBACK THROUGH VCO'S

BACKGROUND OF THE INVENTION

The present invention relates to power control systems and, more particularly, to a method and apparatus for calibration of a signal processing path without interruption of signal processing.

In many electronic systems, signal processing devices are employed to convey signals from one part of a system to another remotely located part. The signal processing devices may be used to convert signals of one form to a better form for transmission. For example, in a motor control system, analog signals representative of motor voltage and current are obtained and converted to digital signals for transmission to a data processor. During long term operation of the system, the conversion apparatus may be subject to drift resulting in errors between the actual analog signal and the converted digital signal. Thus, it is desirable to provide a method and apparatus for calibrating the conversion system without interference with the operating system.

SUMMARY OF THE INVENTION

The above and other objects and advantages are obtained in an electronic signal processing system in which a processed signal in a primary signal processing path is periodically compared to the same signal processed through an auxiliary signal processing path, the auxiliary signal path being periodically calibrated using a precision reference signal. Any error detected in the comparison is corrected by adjusting the effective gain of the primary signal path in a manner to minimize the error and thereby calibrate the conversion system without interruption.

In an illustrative form, the system includes a plurality of voltage controlled oscillators (VCO) each connected for receiving an analog signal and for providing an oscillating output signal having a frequency predeterminately related to the amplitude of a corresponding one of the analog signals. The signals from the VCO's are coupled to respective multibit digital counters for counting the number of oscillations of each of the signals. A microcomputer has a data input terminal coupled for reading the count in each of the counters on a periodic clocked basis, wherein the count increment of a counter at each successive reading provides an indication of the frequency of a corresponding VCO and thereby the amplitude of the corresponding analog signal. The microcomputer can use the digital signals obtained from the counters for controlling the apparatus from which the analog signals are being obtained.

It is well known that VCO's are subject to drift. Consequently, it is desirable to calibrate the VCO's in the above described system on a periodic basis and to do so without interruption of the signal processing in the illustrative control. In a preferred embodiment, one of the VCO's is a calibration VCO and can be selectively coupled to receive one of the analog signals or a precision reference signal. An electronic switching device, such as a multiplex or (MUX), is coupled for receiving each of the analog signals and the reference signal. The microcomputer provides signals to the MUX to selectively gate one of the analog signals or the reference signal to an output terminal of the MUX which is coupled to the calibration VCO. The reference signal is a precision reference selected to produce a preselected digital output signal from the microcomputer. If the calibration VCO drifts, the microcomputer compensates by a digital gain adjustment to maintain a constant output. The microcomputer periodically increments the MUX to couple one of the analog signals to the calibration VCO. The resultant digital count signal is then compared to the digital count signal in the normal analog signal path. Any error is considered to be drift in the VCO in the normal signal processing path and is corrected by a gain adjustment in the microcomputer to eliminate the error using data obtained from the calibration VCO processing path.

BRIEF DESCRIPTION OF THE DRAWING

For a better understanding of the invention, reference may be had to the following description taken in conjunction with the accompanying drawing in which FIG. 1 is a simplified block diagram of a system incorporating the present invention.

DETAILED DESCRIPTION OF THE DRAWING

Turning to FIG. 1, there is shown a simplified block diagram of a portion of a power control system 10 which may be utilized to control operation of an alternating current motor 12, the motor being power from an inverter 14. A plurality of feedback signals are obtained at the inverter 14, including phase A voltage $V_A$, phase B voltage $V_B$, phase A current $I_A$, phase B current $I_B$, filter voltage $V_F$ and DC link voltage $V_L$, all of which may be used in controlling motor 12 through inverter 14. An inverter driver 16 provides control signals to switching devices within inverter 14 for regulating power applied to motor 12. For simplicity, the DC power connections to inverter 14 have been omitted. A detailed description of an AC motor control including an inverter may be had by reference to U.S. Pat. No. 4,023,083. The inverter drive 16 is controlled by signals from a microcomputer (CPU) 18 in a manner well known in the art.

The control loop in the illustrative embodiment converts the above mentioned feedback signals from their analog form at inverter 14 into a digital form for application to the CPU 18. The conversion process is achieved for each signal using a plurality of signal processors or signal processing paths each of which include a voltage controlled oscillator (VCO) 20A-20F. Each of the individual VCO's 20A-20F may comprise a type VFCI10 available from Burr-Brown, Inc.

Each of the analog signals $V_A$, $V_B$, etc. is coupled through a corresponding one of the resistors 22, namely resistors 22A through 22F to an input terminal of a respective VCO 20A-20F. Each of the VCO input terminals is also coupled to receive a precision reference voltage $V_R$ through a respective one of a plurality of input resistors 24A through 24F. The value of $V_R$ is chosen to offset the input signal amplitude at each VCO 20 so that the analog signal input excursions are within a positive voltage range. In one example, the value of $V_R$ is chosen to provide a 1.0 MHZ oscillation frequency when the value of the analog input signal is zero. Although not shown, each of the analog signals $V_A$, $V_B$, etc. may be coupled from inverter 14 to resistors 22 through corresponding buffer amplifiers/drivers of a type well known in the art suitable for conditioning the analog signals for application to the VCO's 20.

The oscillating output signals $F_A$, $F_B$, $F_{IA}$, $F_{IB}$, $F_F$ and $F_L$ from corresponding VCO's 20A-20G are each coupled to respective ones of a plurality of timer/counters 26A-26F. The counters 26A-26F may comprise a 16 bit counter such as a type 8254 available from Intel Corp. These counters are addressable counters whose outputs may be placed on a data/address bus 30 for transmission to CPU 18. The CPU 18 can selectively read the count value from each of the counters 26A-26F in a well known manner. The CPU 18 may comprise a type 80960CA processor from Intel Corp. and associated RAM and ROM chips.

Assuming normal operation, the CPU 18 actuates inverter drive 16 in response to an input command specifying either motor speed or other controllable variable. The voltages and currents associated with motor operation are fed back through corresponding ones of the VCO's 20 and counters 26 so that the CPU 18 may control the motor 12 to a commanded value. However, VCO's 20 are known to drift during prolonged operation. For example, the aforementioned offset value designed to produce a 1.0 MHZ oscillation may eventually produce an oscillation either greater than or less than 1.0 MHZ. In such case, the CPU 18 may command operation of motor 12 at some speed or torque value other than the desired value and actually cause a speed or torque that is in error. In the past, it has been necessary to accept such aberrant operation or to shut down the system for periodic re-calibration.

The present invention provides a means for recalibrating the signal feedback path without shut down of the system. In particular, each of the analog feedback signals $V_A$, $V_B$, $I_A$, $I_B$, $V_F$ and $V_L$ along with the precision reference signal $V_R$ are coupled to respective input terminals of a multiplexor (MUX) 32 of a well known type, such as a 506A. MUX 32 is addressable by CPU 18 for selectively passing the signal on one of the input terminals of the MUX to an output terminal 0. Terminal 0 is coupled through a buffer 34 and resistor 36 to an input terminal of a VCO 40, which VCO is identical to the VCO's 20. VCO 40 is biased in the same manner as VCO's 20 by coupling reference voltage $V_R$ to VCO 40 via resistor 38. The output of VCO 40 is coupled to a timer/counter 42, identical to counters 26, whose output is coupled onto bus 30.

Initially, CPU 18 commands MUX 32 to couple the reference voltage signal $V_R$ to output terminal 0. The $V_R$ signal should result in a predetermined count value in counter 42 upon sampling by CPU 18. If CPU 18 detects that the count value is in error, the CPU sets a new count value as being representative of the reference signal $V_R$ value. This setting process assures that the $V_R$ signal is again associated with a known digital count and thus calibrates the VCO 40. This setting process is equivalent to establishing a gain factor or multiplier to correct for drift in the calibration process path.

The CPU 18 thereafter selects one of the analog signals, such as $V_A$, and couples it through MUX 32, VCO 40 and counter 42. If the CPU detects a count difference between the value in counter 42 and counter 26A, a gain adjust factor is determined which will equate the count value in counter 26A to that in counter 42. For example, if the count value in counter 42 is determined by CPU 18 to represent a voltage of 100 volts and the count value in counter 26A is determined to represent a voltage of 99 volts, the CPU 18 computes a gain adjust factor or multiplier of 1/0.99 for each voltage value obtained as a result of sampling counter 26A. Thus, the CPU 18 is able to re-calibrate the feedback loop, including VCO 20, by adjusting an internal gain factor based on comparison of the digital outputs of counters 26 and counter 42 for each monitored analog signal. Preferably, the CPU 18 is programmed to step through each of the analog signals applied to MUX 32 on a periodic basis so that the feedback loops are continually being calibrated.

While the CPU 18 is described as setting a gain adjust, it will be appreciated that correspondence between count values in counters 26 and an associated voltage or current reference may also be achieved through a look-up table. In such event, the CPU 18 would shift correspondence between count values and reference values within the look-up table to achieve the same result.

What is claimed is:

1. A calibration system for a signal monitoring system wherein a plurality of variable amplitude signals are converted to corresponding variable frequency signals:
   a plurality of voltage controlled oscillators (VCO) each connected for receiving a respective one of a plurality of variable amplitude signals;
   a multiplexor having a plurality of input terminals, each of the plurality of variable amplitude signals being coupled to a respective one of the input terminals of the multiplexor;
   a calibration VCO having an input terminal connected to an output terminal of the multiplexor;
   a predefined calibration signal coupled to one of the input terminals of said multiplexor;
   processor means, coupled for receiving variable frequency signals from each of said VCO's, for converting each of the variable frequency signals into system usable signals representative of each of the variable amplitude signals, the processor means further comprising means for selectively switching the variable amplitude signals and the calibration signal to the output terminal of the multiplexor and for comparing a signal from the calibration VCO to a signal from a corresponding one of the plurality of VCO's, the processor means correcting the system variable signals to compensate for any difference with respect to the calibration VCO signal.

2. The system of claim 1 wherein the processor means further comprises:
   a plurality of counters for counting signal oscillations, each coupled to an output terminal of a respective one of the VCO's; and
   a data processor, connected for sampling the count of each of the counters, for converting the count to a signal representative of the amplitude of a respective one of the variable amplitude signals, the processor further selectively coupling each of the variable amplitude signals through the calibration VCO for developing a calibration count signal and comparing the calibration count signal to a corresponding count signal from one of the plurality of VCO's for developing an error signal, the processor adjusting the corresponding count signal to minimize the error signal.

3. The system of claim 1 wherein the processor means further comprises:
   a plurality of counters for counting signal oscillations, each coupled to an output terminal of a respective one of the VCO's.

4. The system of claim 3 wherein the processor means further comprises:
   a data processor, connected for sampling the count of each of the counters, for converting the count to a signal representative of the amplitude of a respective one of the variable amplitude signals.

5. The system of claim 6 wherein the data processor further selectively couples each of the variable amplitude signals through the calibration VCO for developing a calibration count signal and comparing the calibration count signal to a corresponding count signal from one of the plurality of VCO's for developing an error signal.

6. The system of claim 5 wherein the data processor adjusts the corresponding count signal to minimize the error signal.

7. A method for calibrating a primary signal processor without interruption of signal processing using a calibration signal processor, the method comprising the steps of:
processing a calibration reference signal through the calibration signal processor for developing a calibration signal;
comparing the calibration signal to a predetermined calibration signal;
determining a multiplier necessary to equate the calibration signal to the predetermined calibration signal;
processing a signal substantially simultaneously through both the primary signal processor and the calibration signal processor;
multiplying the signal processed through the calibration signal processor by the determined multiplier;
comparing the signal obtained by the step of multiplying to the signal processed through the primary signal processor;
computing a factor necessary to equate the signal processed through the primary signal processor to the signal obtained by the step of multiplying; and
adjusting each signal processed through the primary signal processor by the computed factor.

8. A method for calibrating a primary signal processor subject to drift, without interruption of signal processing, using a calibrated signal processor, the method comprising the steps of:
processing a signal substantially simultaneously through both the primary signal processor and the calibration signal processor to obtain at least two resulting signals;
comparing the resulting signals and;
if the resulting signals differ, developing a multiplier for equating the resulting signal from the primary signal processor to the resulting signal from the calibration signal processor.

9. The method of claim 8 further comprising the step of:
multiplying each subsequent signal from the primary signal processor by the multiplier to correct drift.

10. A system for calibration of a signal processor without interruption of signal processing through the processor, the system comprising;
first voltage to frequency converter means having an input for receiving an analog signal and an output for producing an oscillating signal having a frequency corresponding to the amplitude of the analog signal;
first counter means having an input coupled to the output of the converter means, the counter means providing a digital representation of the frequency of the oscillating signal;
second voltage to frequency converter means having an input for receiving an analog signal and an output for producing an oscillating signal having a frequency corresponding to the amplitude of the analog signal;
second counter means having an input coupled to the output of the second converter means, the second counter means providing a digital representation of the frequency of the oscillating signal;
a precision analog reference signal selectively coupled to the second converter means for calibration thereof; and
switch means for selectively coupling the precision reference signal and the analog signal applied to the input of the first converter means to the second converter means whereby the output of the first counter means can be compared to the output of the second counter means for calibration of the signal processor comprising the first converter means and the first counter means.

11. The system of claim 10 further comprising:
a plurality of converter means and a corresponding plurality of counter means, each of the converter means being connected for receiving a respective one of a plurality of analog input signals, said the means including means for selectively coupling each of said plurality of signals to the second converter.

12. The system of claim 11 further comprising:
a microcomputer for comparing a signal processed through a selected one of the plurality of converter means to the same signal processed through the second converter means.

13. The system of claim 12 wherein the switch means comprises:
a multiplexor addressable by the microcomputer for selecting one of the plurality of analog signals for coupling to the second converter means.

14. The system of claim 12 wherein the microcomputer is connected for supplying drive signals to an electric motor, the plurality of analog signals comprising voltage and current signals indicative of operation of the motor.

15. The system of claim 10 further comprising:
a plurality of voltage to frequency converter means an a corresponding plurality of counter means, each of he converter means being connected for receiving a respective one of a plurality of analog input signals.

16. The system of claim 15 wherein the switch means further comprises:
means for selectively coupling each of the plurality of signals to the second converter means.

17. The system of claim 16 further comprising:
a microcomputer for comparing a signal processed through a selected one of the plurality of converter mans to the same signal processed through the second converter means.

18. The system of claim 16 wherein the switch means further comprises:
a multiplexor addressable by the microcomputer for selecting one of the plurality of analog signals for coupling to the second converter.

19. The system of claim 16 wherein the microcomputer is connected for supplying drive signals to an electric motor, the plurality of analog signals comprising voltage and current signals indicative of motor operation.

* * * * *